United States Patent
Uesaka et al.

(10) Patent No.: US 11,008,633 B2
(45) Date of Patent: May 18, 2021

(54) NON-ORIENTED ELECTRICAL STEEL SHEET AND PRODUCTION METHOD THEREOF

(71) Applicant: JFE Steel Corporation, Tokyo (JP)

(72) Inventors: Masanori Uesaka, Tokyo (JP); Tadashi Nakanishi, Tokyo (JP); Seiji Nabeshima, Tokyo (JP); Tomoyuki Okubo, Tokyo (JP); Yoshihiko Oda, Tokyo (JP); Hiroaki Nakajima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 293 days.

(21) Appl. No.: 16/070,043

(22) PCT Filed: Jan. 13, 2017

(86) PCT No.: PCT/JP2017/000925
§ 371 (c)(1),
(2) Date: Jul. 13, 2018

(87) PCT Pub. No.: WO2017/122761
PCT Pub. Date: Jul. 20, 2017

(65) Prior Publication Data
US 2019/0017138 A1    Jan. 17, 2019

(30) Foreign Application Priority Data

Jan. 15, 2016  (JP) .............................. JP2016-005821
Nov. 29, 2016  (JP) .............................. JP2016-230983

(51) Int. Cl.
*C21D 8/12*     (2006.01)
*C22C 38/02*    (2006.01)
(Continued)

(52) U.S. Cl.
CPC ............ *C21D 8/1272* (2013.01); *C21C 7/064* (2013.01); *C21C 7/068* (2013.01); *C21D 8/12* (2013.01);
(Continued)

(58) Field of Classification Search
CPC ........... C21C 7/064; C21C 7/068; C21D 8/12; C21D 8/1222; C21D 8/1233;
(Continued)

(56) References Cited

U.S. PATENT DOCUMENTS

2008/0112838 A1    5/2008  Miyazaki et al.
2009/0250145 A1   10/2009  Kurosaki et al.
(Continued)

FOREIGN PATENT DOCUMENTS

CN    1556869 A    12/2004
CN    101358317 A   2/2009
(Continued)

OTHER PUBLICATIONS

Extended European Search Report dated Nov. 28, 2018, of counterpart European Application No. 17 738 513.5.
(Continued)

*Primary Examiner* — Jenny R Wu
(74) *Attorney, Agent, or Firm* — DLA Piper LLP (US)

(57) ABSTRACT

A steel containing C: not more than 0.0050%, Si: 0.1-5.0%, Mn: 0.02-3.0%, sol. Al: not more than 0.0050%, P: not more than 0.2%, S: not more than 0.0050%, N: not more than 0.0040%, T. Ca: 0.0010-0.0080%, T. O: not more than 0.0100% and having (T. Ca/T. O) of not less than 0.50 but not more than 2.0 by decarburizing to a C content of not more than 0.0050%, adding Si, decreasing Al as much as possible, and adding Ca is melted to form a slab. The slab is subjected to a hot rolling at a coiling temperature of not lower than 550° C., a cold rolling and a finish annealing, or
(Continued)

the slab is subjected to a hot rolling, a hot band annealing at a temperature of 900-1150° C., a cold rolling and a finish annealing to thereby produce a non-oriented electrical steel sheet.

8 Claims, 1 Drawing Sheet

(51) Int. Cl.
| | |
|---|---|
| C22C 38/04 | (2006.01) |
| C22C 38/06 | (2006.01) |
| C22C 38/00 | (2006.01) |
| C22C 38/60 | (2006.01) |
| C21C 7/064 | (2006.01) |
| C21C 7/068 | (2006.01) |
| H01F 1/147 | (2006.01) |

(52) U.S. Cl.
CPC ......... *C21D 8/1222* (2013.01); *C21D 8/1233* (2013.01); *C22C 38/00* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/60* (2013.01); *H01F 1/147* (2013.01); *H01F 1/14766* (2013.01); *Y02P 10/20* (2015.11)

(58) Field of Classification Search
CPC ..... C21D 8/1272; C22C 38/00; C22C 38/001; C22C 38/002; C22C 38/004; C22C 38/005; C22C 38/008; C22C 38/02; C22C 38/04; C22C 38/06; C22C 38/60; H01F 1/147; H01F 1/14766; Y02P 10/216
See application file for complete search history.

(56) References Cited

U.S. PATENT DOCUMENTS

| | | |
|---|---|---|
| 2011/0094699 A1 | 4/2011 | Miyazaki et al. |
| 2015/0034212 A1 | 2/2015 | Zhang et al. |
| 2015/0059929 A1* | 3/2015 | Zaizen ................... C21D 6/005 148/111 |
| 2016/0042850 A1* | 2/2016 | Oda ....................... C22C 38/002 148/307 |
| 2016/0203895 A1 | 7/2016 | Nakanishi et al. |
| 2017/0194082 A1 | 7/2017 | Murakami et al. |
| 2017/0211161 A1* | 7/2017 | Nakanishi ................ C21D 8/12 |
| 2017/0314090 A1* | 11/2017 | Okubo .................... C22C 38/02 |
| 2018/0002789 A1* | 1/2018 | Nakanishi ............. C22C 38/004 |
| 2018/0355454 A1* | 12/2018 | Okubo .................... C22C 38/02 |

FOREIGN PATENT DOCUMENTS

| | | | | |
|---|---|---|---|---|
| EP | 0 349 853 A2 | 1/1990 | | |
| EP | H02-4918 A | 1/1990 | | |
| JP | 2016-47943 A | 4/1916 | | |
| JP | 5-171280 A | 7/1993 | | |
| JP | 10-60532 A | 3/1998 | | |
| JP | 2000-219916 A | 8/2000 | | |
| JP | 2000-219917 A | 8/2000 | | |
| JP | 2000219916 A | * | 8/2000 | |
| JP | 2000219917 A | * | 8/2000 | |
| JP | 2001-316729 A | 11/2001 | | |
| JP | 2004-68084 A | 3/2004 | | |
| JP | 2004068084 A | * | 3/2004 | ............... H02K 1/02 |
| JP | 4126479 B2 | 7/2008 | | |
| JP | 2014198896 A | * | 10/2014 | ........... C22C 38/008 |
| JP | 2015-40308 A | 3/2015 | | |
| RU | 2362829 C2 | 7/2009 | | |
| RU | 2400325 C1 | 9/2010 | | |
| TW | 200403346 A | 3/2004 | | |
| TW | 201009861 A | 3/2010 | | |
| TW | 201512422 A | 4/2015 | | |
| WO | 2013/131213 A1 | 8/2000 | | |
| WO | WO-2004013365 A1 | * | 2/2004 | ............. C22C 38/04 |
| WO | 2016/002904 A1 | 1/2016 | | |

OTHER PUBLICATIONS

Office Action dated Mar. 19, 2019, of counterpart Russian Patent Application No. 2018125734, including an English translation.
Office Action dated Aug. 6, 2019, of counterpart Chinese Patent Application No. 201780006482.3, including a Search Report in English.
Taiwanese Office Action dated Jul. 7, 2017, of corresponding Taiwanese Application No. 106101230.
Japanese Office Action dated May 16, 2018, of corresponding Japanese Application No. 2017-522434.
Extended European Search Report dated Sep. 11, 2018, of counterpart European Application No. 17 738 513.5.
Office Action dated Aug. 12, 2019, of counterpart Korean Patent Application No. 2018-7019168, including a Concise Statement of Relevance of Office Action in English.

* cited by examiner

NON-ORIENTED ELECTRICAL STEEL SHEET AND PRODUCTION METHOD THEREOF

TECHNICAL FIELD

This disclosure relates to a non-oriented electrical steel sheet used as an iron core material for electric apparatus or the like and a method of producing the same.

BACKGROUND

In recent years, motors used for domestic air conditioners and the like have been demanded to have decreased power consumption and high energy efficiency associated with the increasing demand for energy-savings. To this end, non-oriented electrical steel sheets used as an iron core material for such a motor are strongly demanded to have higher-performance characteristics such as, for example, low iron loss to reduce iron loss of the motor and high magnetic flux density to reduce copper loss of the motor.

As a method of reducing iron loss of the non-oriented electrical steel sheet has hitherto been used a method of increasing an addition amount of elements which increase specific resistance of steel such as Si, Al, Mn and the like to decrease an eddy current loss. In that method, however, a decrease in the magnetic flux density cannot be avoided. Therefore, there have been proposed some techniques for not only reducing the iron loss but also increasing the magnetic flux density.

For example, JP-A-H05-171280 proposes a technique of increasing the magnetic flux density by adding Sb or Sn to a slab containing C: not more than 0.02 wt %, Si or Si+Al: not more than 4.0 wt %, Mn: not more than 1.0 wt % and P: not more than 0.2 wt %. In that technique, however, the magnetic properties are largely varied, and it is necessary to perform two cold rollings sandwiching a short-time annealing therebetween after hot rolling, thereby causing a problem that the production cost is higher.

JP-A-H10-060532 proposes a technique wherein a composition ratio of MnO to oxide inclusions (MnO/($SiO_2$+$Al_2O_3$+CaO+MnO)) existent in a hot rolled sheet containing C: not more than 0.008 wt %, Si: not more than 4 wt %, Al: not more than 2.5 wt %, Mn: not more than 1.5 wt %, P: not more than 0.2 wt %, S: not more than 0.005 wt % and N: not more than 0.003 wt % is controlled to not more than 0.35, whereby the number of inclusions extending in the rolling direction is decreased to improve the growth property of crystal grains. However, that technique has problems that the magnetic properties, particularly iron loss property becomes unstable when the Ca concentration is high and the Al concentration is low.

In recent years, scrap generated in the blanking of iron core material has been frequently reused as a starting material of foundry pig from a viewpoint of recycling iron source. However, when the Al amount contained in the foundry pig is not less than 0.05 mass %, blowholes (shrinkage cavities) are easily caused in a casting so that it is desired to control the Al amount contained in the scrap to less than 0.05 mass %.

As to a non-oriented electrical steel sheet having a decreased Al amount, Japanese Patent No. 4126479 proposes a technique wherein the texture is improved to increase the magnetic flux density by decreasing an Al content to not more than 0.017 mass %, preferably not more than 0.005 mass %.

However, the technique disclosed in Japanese Patent No. 4126479 adopts a single rolling process at room temperature as the cold rolling so that an effect of sufficiently increasing the magnetic flux density cannot be obtained. That problem is solved by conducting two or more cold rollings sandwiching an intermediate annealing therebetween as the cold rolling, but there is caused another problem wherein the production cost is increased. It is also effective to perform a so-called warm rolling as the cold rolling by rolling at a sheet temperature increased to about 200° C. to increase the magnetic flux density. However, there is a problem that new equipment and complicated process control are necessary to perform the warm rolling. Further, Japanese Patent No. 4126479 discloses that even when Al is decreased, but N is not decreased, fine AlN is precipitated during cooling in hot band annealing to suppress grain growth in the recrystallization annealing and deteriorate the iron loss property.

As mentioned above, when the Al content is decreased, it is, in fact, difficult to produce non-oriented electrical steel sheets having a high magnetic flux density and a low iron loss in a low cost and a high productivity without requiring new equipment and complicated process control.

It could therefore be helpful to provide a non-oriented electrical steel sheet having a low Al content, an excellent recyclability, a high magnetic flux density and a low iron loss, and also a method of producing such a steel sheet in a low cost and a high productivity.

SUMMARY

We focused on the relationship between the chemical composition of oxide inclusions existing in the steel sheet and magnetic properties. We found that it is effective to increase the grain growth property in hot band annealing or finish annealing to increase the magnetic flux density and decrease the iron loss in the non-oriented electrical steel sheet and, to this end, it is important to control the concentration ratio of the total Ca to the total oxygen (T. Ca/T. O) in steel to a proper range by decarburizing the C concentration in a raw steel material to an extremely low carbon region, adding Si, decreasing the Al content as much as possible and then adding Ca alloy. It is preferable to rationalize a concentration ratio (sol. Al/Si) of sol. Al (acid-soluble Al concentration) to Si, and more preferable to control a composition of CaO, $SiO_2$ and $Al_2O_3$ in the oxide inclusions contained in the steel to a proper range.

We thus provide:

A non-oriented electrical steel sheet having a chemical composition comprising C: not more than 0.0050 mass %, Si: 0.1-5.0 mass %, Mn: 0.02-3.0 mass %, sol. Al: not more than 0.0050 mass %, P: not more than 0.2 mass %, S: not more than 0.0050 mass %, N: not more than 0.0040 mass % and the remainder being Fe and inevitable impurities, characterized in that a total Ca concentration (T. Ca) in steel is 0.0010-0.0080 mass %, and a total oxygen concentration (T. O) is not more than 0.0100 mass %, and a concentration ratio (T. Ca/T. O) of a total Ca to a total oxygen is not less than 0.50 but not more than 2.0.

The non-oriented electrical steel sheet is characterized in that a concentration ratio (sol. Al/Si) of sol. Al to Si is not more than 0.0020.

A non-oriented electrical steel sheet has a chemical composition comprising C: not more than 0.0050 mass %, Si: 0.1-5.0 mass %, Mn: 0.02-3.0 mass %, sol. Al: not more than 0.0050 mass %, P: not more than 0.2 mass %, S: not more than 0.0050 mass %, N: not more than 0.0040 mass % and the remainder being Fe and inevitable impurities, characterized in that a total Ca concentration (T. Ca) in steel is 0.0010-0.0080 mass %, and a total oxygen concentration (T. O) is not more than 0.0100 mass %, and a composition ratio ($CaO/SiO_2$) of CaO to $SiO_2$ in oxide inclusions existing in a sheet thickness section in a rolling direction and having a size in a sheet thickness direction of not less than 0.2 µm is 0.50-4.0.

The non-oriented electrical steel sheet is characterized in that a composition ratio ($Al_2O_3/(CaO+SiO_2+Al_2O_3)$) of $Al_2O_3$ to ($CaO+SiO_2+Al_2O_3$) in the oxide inclusions existing in a sheet thickness section in a rolling direction and having a size in a sheet thickness direction of not less than 0.2 µm is not more than 0.15.

The non-oriented electrical steel sheet is characterized by containing one or two selected from Sn: 0.01-0.1 mass % and Sb: 0.01-0.1 mass % in addition to the above chemical composition.

The non-oriented electrical steel sheet is characterized by containing one or more selected from Cu: 0.01-0.5 mass %, Ni: 0.01-0.5 mass % and Cr: 0.01-0.5 mass % in addition to the above chemical composition.

The non-oriented electrical steel sheet is characterized by containing one or two selected from REM: 0.0001-0.0050 mass % and Mg: 0.0001-0.0050 mass % in addition to the above chemical composition.

Our method produces a non-oriented electrical steel sheet by hot rolling a slab having a chemical composition and oxide inclusions as described in any one of the above to form a hot rolled sheet, cold rolling the hot rolled sheet without hot band annealing and subjecting to a finish annealing, characterized in that a coiling temperature in the hot rolling is not lower than 550° C.

Also, our method produces a non-oriented electrical steel sheet by hot rolling a slab having a chemical composition and oxide inclusions as described in any one of the above to form a hot rolled sheet and subjecting the hot rolled sheet to hot band annealing, then cold rolling and finish annealing, characterized in that the hot band annealing is performed at a temperature of 900-1150° C.

Our method of producing a non-oriented electrical steel sheet may be characterized in that molten iron subjected to desulfurization and dephosphorization is refined in a converter to provide molten steel, and the molten steel is subjected to a vacuum degassing process to decarburize C to not more than 0.0050 mass % and added with elements and/or alloy for adjusting a composition, and then CaSi alloy is added to a ladle so that a total Ca concentration in steel (T. Ca) is 0.0010-0.0080 mass %, and a total oxygen concentration (T. O) is not more than 0.0100 mass %, and a concentration ratio (T. Ca/T. O) of total Ca to total oxygen is not less than 0.50 but not more than 2.0.

It is thus possible to provide a non-oriented electrical steel sheet having a high magnetic flux density, a low iron loss and an excellent recyclability in a low cost without requiring new equipment and complicated process control.

DETAILED DESCRIPTION

To examine a method of improving the texture of a non-oriented electrical steel sheet to improve magnetic properties, we prepared various steels having a composition system based on the composition system of the steel disclosed in Japanese Patent No. 4126479 and containing an extremely decreased Al content and added elements P, Sn and Ca, concretely a chemical composition comprising C: 0.0015-0.0035 mass %, Si: 1.6 mass %, Mn: 0.1 mass %, P: 0.07 mass %, S: 0.0010-0.0030 mass %, sol. Al: 0.001 mass %, N: 0.0015-0.0025 mass %, O: 0.0020-0.0070 mass %, Ca: 0.0020-0.0040 mass % and Sn: 0.04 mass %. Moreover, the reason why each of C, S, O, Ca and N has a composition range is due to the scattering caused in the melting, which is not intended.

Next, the slab is reheated to a temperature of 1100° C. and hot rolled to provide a hot rolled sheet having a sheet thickness of 2.3 mm, which is pickled, cold rolled to form a cold rolled sheet having a final thickness of 0.50 mm and then subjected to a finish annealing at a temperature of 1000° C.

From the thus obtained steel sheet after the finish annealing are cut out Epstein test specimens in a rolling direction (L) and a direction perpendicular to the rolling direction (C) to measure an iron loss $W_{15/50}$ (iron loss in excitation at a magnetic flux density of 1.5 T and a frequency of 50 Hz) according to JIS C2552. As a result, the iron loss $W_{15/50}$ is largely varied.

To elucidate the cause of varying the iron loss, a section parallel to the rolling direction (L-section) in the steel sheet after the finish annealing is observed with a scanning electron microscope (SEM) to analyze chemical compositions of inclusions existing in the steel sheet. As a result, we confirmed that the inclusions are mainly oxide inclusions comprised of CaO, $SiO_2$ and $Al_2O_3$, and most of the oxide inclusions in the steel sheet having a high iron loss extend in the rolling direction, and these extending inclusions have a tendency that a composition ratio (mass %) ($CaO/SiO_2$) of CaO to $SiO_2$ is low and a composition ratio (mass %) ($Al_2O_3/(CaO+SiO_2+Al_2O_3)$) of $Al_2O_3$ to ($CaO+SiO_2+Al_2O_3$) is high. As a result of further examining the composition of the raw material, we confirmed that the steel sheet having a high iron loss has a tendency that a composition ratio (mass %) (T. Ca/T. O) of T. Ca to T.O in the steel raw material is low and a composition ratio (mass %) (sol. Al/Si) of sol. Al to Si is high during the melting of steel.

To change the chemical composition of the oxide inclusions in the steel having the above composition system, we prepared various steels each having a composition system obtained by varying addition amounts of Si, Al and Ca as a deoxidizer, concretely a chemical composition comprising C: 0.0015-0.0035 mass %, Si: 1.5-2.0 mass %, Mn: 0.4 mass %, P: 0.07 mass %, S: 0.0010-0.0030 mass %, sol. Al: 0.0001-0.0050 mass %, N: 0.0015-0.0025 mass %, Sn: 0.02-0.04 mass %, Ca: 0.0001 mass % to 0.0050 mass % and T. O: 0.0020-0.0070 mass %. Moreover, the reason why each of C, S and N has a composition range is due to scattering caused in the melting, which is not intended.

Next, the slab is reheated to a temperature of 1100° C. and hot rolled to provide a hot rolled sheet having a sheet thickness of 2.3 mm, which is pickled, cold rolled to form a cold rolled sheet having a final thickness of 0.50 mm and then subjected to a finish annealing at a temperature of 1000° C.

From the thus obtained steel sheet after finish annealing are cut out Epstein test specimens in a rolling direction (L) and a direction perpendicular to the rolling direction (C) to measure an iron loss $W_{15/50}$ (iron loss in excitation at a magnetic flux density of 1.5 T and a frequency of 50 Hz) according to JIS C2552.

Also, each chemical composition of 100 or more oxide inclusions existing in a section of the finish annealed sheet in the rolling direction (L section) is analyzed with a scanning electron microscope (SEM) to measure an average composition (mass %) of the oxide inclusions. Moreover, oxides of Mn, Mg and so on other than Si, Al and Ca are observed in the oxide inclusions, but the amounts thereof are as small as not more than 10 at % so that they are not considered in the calculation of the composition ratio. Also, there are oxides that are composites with sulfide. In this case, only an oxide is evaluated to measure a composition ratio of oxides.

Figure 1:
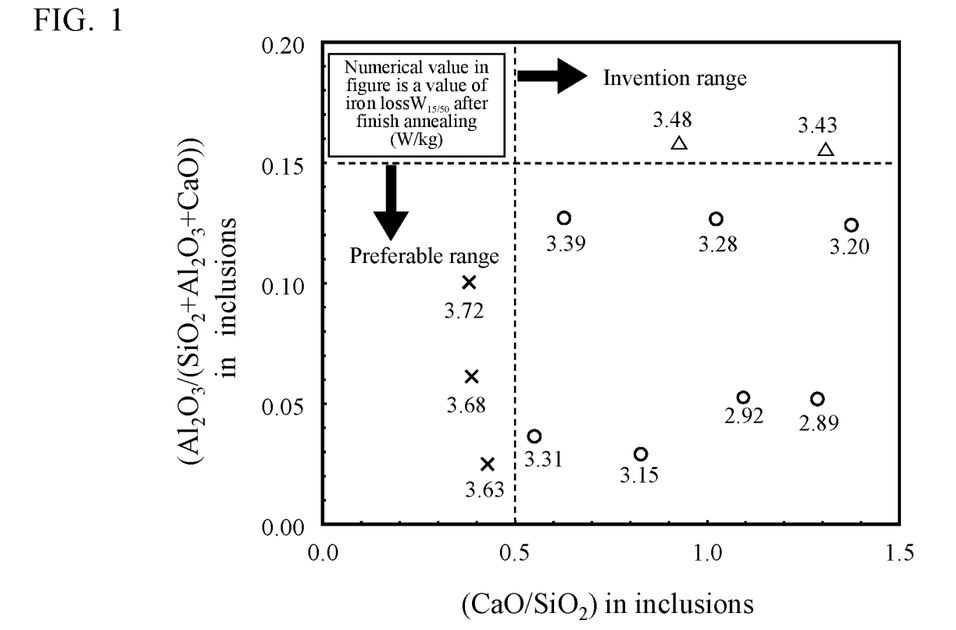
FIG. 1 is a graph showing an influence of a chemical composition of oxide inclusions existing in a steel sheet upon iron loss $W_{15/50}$.

FIG. 1 shows a relation between ($CaO/SiO_2$) and ($Al_2O_3/(SiO_2+Al_2O_3+CaO)$) in oxide inclusions and iron loss $W_{15/50}$. As seen from FIG. 1, when ($CaO/SiO_2$) in the oxide inclusions is less than 0.50, the iron loss tends to be largely increased to deteriorate the property and, also, even when ($CaO/SiO_2$) in the oxide inclusions is not less than 0.50, the iron loss property tends to be deteriorated as long as ($Al_2O_3/(SiO_2+Al_2O_3+CaO)$) exceeds 0.15. Moreover, we confirmed that the steel sheet having a higher iron loss tends to have more oxide inclusions in the form of extending in the rolling direction and a smaller crystal grain size.

When ($CaO/SiO_2$) in the oxide inclusions is decreased or ($Al_2O_3/(SiO_2+Al_2O_3+CaO)$) is increased, the melting point of the inclusions lowers so that the inclusions are easily deformed in the rolling direction to have a form of extending in the rolling direction during hot rolling. The extending inclusions are rendered into a fracture state by cold rolling. When inclusions in such a state exist, the growth of crystal grains is suppressed in the finish annealing to make the crystal grains small. Hence, movement of magnetic domain walls is blocked to deteriorate the iron loss property. To improve the magnetic properties of the steel sheet after the finish annealing (product sheet), therefore, it is considered effective to control the chemical composition of the oxide inclusions existing in steel to a proper range to thereby prevent extension in the rolling direction during the hot rolling.

We believe from FIG. 1 that it is important to increase ($CaO/SiO_2$) in the oxide inclusions to decrease the iron loss and, to this end, it is effective to increase the Ca concentration in steel and/or decrease the O concentration in steel. The reason therefor is believed to be as follows.

Among $SiO_2$, $Al_2O_3$, and $CaO$, $CaO$ has the lowest oxide formation standard energy, and $Al_2O_3$ has the second lowest oxide formation standard energy, and the $SiO_2$ has the highest oxide formation standard energy. Accordingly, we believe that oxygen in steel first produces CaO, and the remaining oxygen produces $Al_2O_3$ and produces $SiO_2$ at the end. Therefore, we believe that when the amount of oxygen in steel is decreased, ($CaO/SiO_2$) in the oxide inclusions is increased and also that when (T. Ca/T. O) in steel is increased, ($CaO/SiO_2$) is increased in the oxide inclusions.

The iron loss is decreased by decreasing ($Al_2O_3/(SiO_2+Al_2O_3+CaO)$) in the oxide inclusions. To this end, it is necessary to decrease the Al amount in steel. However, there is a limit to the decrease of the Al amount. Therefore, we believe that ($Al_2O_3/(SiO_2+Al_2O_3+CaO)$) can be decreased by increasing Si and Ca contents in steel to decrease Al/(Ca+Si)≈Al/Si (Ca is very small compared to Si and is disregarded).

Figure 2:
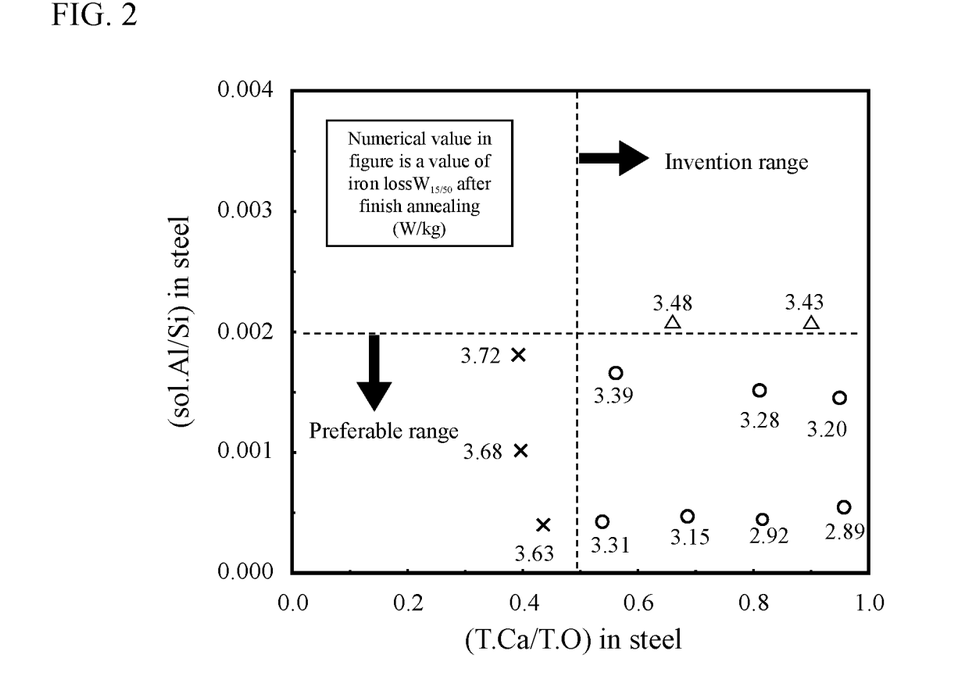
FIG. 2 is a graph showing an influence of (T. Ca/T. O) and (sol. Al/Si) in a steel sheet upon iron loss $W_{15/50}$ after finish annealing.

FIG. 2 shows the relationship among a ratio (T. Ca/T. O) of the total Ca concentration (mass %) to the total oxygen concentration (mass %) in steel during steel-making, a ratio (sol. Al/Si) of the sol. Al concentration (mass %) to the Si concentration (mass %) in steel during steel-making and an iron loss $W_{15/50}$, based on the above considerations. From FIG. 2, we confirmed that when (T. Ca/T. O) in steel is less than 0.50, the iron loss is very high, and even when (T. Ca/T. O) in steel is not less than 0.50, the iron loss is somewhat high as long as (sol. Al/Si) in steel exceeds 0.0020.

The chemical composition of our non-oriented electrical steel sheet (product sheet) will be described below.

C: not more than 0.0050 mass %

C is a harmful element causing magnetic aging to deteriorate iron loss property of the product sheet. Particularly, when it exceeds 0.0050 mass %, the above deterioration becomes remarkable so that it is limited to not more than 0.0050 mass %. Preferably, it is not more than 0.0030 mass %. Moreover, the lower limit is not particularly limited because the smaller amount is more preferable.

Si: 0.1-5.0 mass %

Si is an element effective to increase electrical resistance of steel to decrease an iron loss. It is also added as a deoxidizer for steel and contained in an amount of not less than 0.1 mass %. However, when Si exceeds 5.0 mass %, not only the magnetic flux density is decreased, but also steel is embrittled to generate cracks during the cold rolling, and the productivity is largely decreased. Therefore, the upper limit is 5.0 mass %. Preferably, it is 1.5-5.0 mass %. More preferably, it is 1.6-3.8 mass %.

Mn: 0.02-3.0 mass %

Mn is an element effective in increasing electrical resistance of steel to decrease the iron loss like Si and has an effect of preventing hot brittleness so that it is contained in an amount of not less than 0.02 mass %. On the other hand, when it exceeds 3.0 mass %, the magnetic flux density is decreased so that the upper limit is 3.0 mass %. Preferably, it is 0.15-2.5 mass %. More preferably, it is 0.15-1.0 mass %.

P: not more than 0.2 mass %

P has a large effect of increasing the hardness of steel with an addition of a slight amount and is an element useful to improve a blanking property so that it can be added properly in accordance with the required hardness. However, an excessive addition of P brings about a decrease of cold rolling property so that the upper limit is 0.2 mass %. Preferably, it is 0.04-0.15 mass %.

S: not more than 0.0050 mass %

S forms precipitates or inclusions as a sulfide that deteriorates not only the magnetic properties of the product sheet, but also productivity (hot rolling property) so that the smaller amount is more preferable. Therefore, it is limited to not more than 0.0050 mass %. Especially, it is preferably not more than 0.0025 mass % when the magnetic properties are considered important. Moreover, the S amount is preferably smaller so that the lower limit is not particularly defined.

sol. Al: not more than 0.0050 mass %

Al is an element effective in increasing the electrical resistance of steel to decrease the iron loss like Si and is also added as a deoxidizer for steel. As previously mentioned, the amount of Al is desirable to be less than 0.05 mass % from a viewpoint of recycling the scrap as a starting material for foundry pig and is preferably smaller. Al is further decreased to improve the texture and increase the magnetic flux density so that it is limited to not more than 0.0050 mass % as sol. Al (acid-soluble Al). Preferably, it is not more than 0.0020 mass %.

N: not more than 0.0040 mass %

N is a harmful element deteriorating the magnetic properties like C and causes the above bad influence remarkably in a low-Al material so that it is limited to not more than 0.0040 mass %. Preferably, it is not more than 0.0030 mass %. Moreover, the smaller amount of N is more preferable so that the lower limit is not particularly defined.

T. Ca: 0.0010-0.0080 mass %

Ca forms coarse precipitates as CaS to suppress precipitation of fine sulfide such as MnS or the like so that it has an effect of improving grain growth to decrease the iron loss. It is contained in an amount of not less than 0.0010 mass % as T. Ca (total Ca concentration in steel) to obtain the above effect. However, the addition exceeding 0.0080 mass % increases the amount of Ca sulfide or Ca oxide to block grain growth and deteriorate the iron loss property so that the upper limit is 0.0080 mass %. Preferably, it is 0.0015-0.0050 mass %. Here, the total Ca concentration (T. Ca) means a Ca concentration being a sum of acid-soluble Ca and acid-insoluble Ca in steel.

T. O: not more than 0.0100 mass %

When O exceeds 0.0100 mass % as T. O (total O concentration in steel), the amount of oxide is increased to block the grain growth and deteriorate the iron loss property so that the upper limit is 0.0100 mass %. Preferably, it is not more than 0.0060 mass %. Here, the total 0 concentration (T. O) means O concentration being a sum of acid-soluble O and acid-insoluble O.

T. Ca/T. O: not less than 0.50 but not more than 2.0

As previously mentioned, the ratio (T. Ca/T. O) of the total Ca concentration to the total 0 concentration in steel is necessary to be not less than 0.50 but not more than 2.0. When the ratio is less than 0.50, the oxide inclusions exhibit a form of extending in the rolling direction, and the grain growth is blocked to deteriorate the iron loss property. The reason why the upper limit is 2.0 is due to the fact that when the ratio exceeds 2.0, a coarsened oxide inclusion is a start point of cracking to considerably damage the productivity. Preferably, it is not less than 0.60 but not more than 1.8.

sol. Al/Si: not more than 0.0020

In the non-oriented electrical steel sheet, it is preferable that the ratio (sol. Al/Si) of the sol. Al concentration to the Si concentration in steel is limited to not more than 0.0020 while satisfying the above chemical composition, to further improve the iron loss property. When (sol. Al/Si) exceeds 0.0020, the oxide inclusions exhibit a form of extending in the rolling direction, and there is a risk that the grain growth is blocked to deteriorate the iron loss property. More preferably, it is not more than 0.0015. Here, sol. Al means an acid-soluble Al. It should be defined accurately as (T. Al-sol. Al)/Si, but the reason for defining as (sol. Al/Si) is due to the fact that sol. Al is related with T. Al, and thus sol. Al can be more easily analyzed.

Also, the non-oriented electrical steel sheet can contain the following ingredients in addition to the above ingredients.

One or two selected from Sn: 0.01-0.1 mass % and Sb: 0.01-0.1 mass %

Both Sn and Sb have an effect of improving the texture to improve the magnetic properties. Each element is preferably added in an amount of not less than 0.01 mass % alone or in admixture to obtain the above effect. However, when the addition amount is excessive, steel is embrittled to cause sheet fracture and/or surface defects such as scab or the like in the process of steel sheet production so that each upper limit is preferably 0.1 mass %. More preferably, it is 0.02-0.05 mass %.

One or more selected from Cu: 0.01-0.5 mass %, Ni: 0.01-0.5 mass % and Cr: 0.01-0.5 mass %

Cu, Ni and Cr can be contained because they are elements effective for increasing specific resistance of steel to decrease the iron loss. Each element is preferably added in an amount of not less than 0.01 mass % to obtain the above effect. On the other hand, these elements are expensive compared to Si and Al so that the each addition amount is preferably not more than 0.5 mass %.

One or two selected from REM: 0.0001-0.0050 mass % and Mg: 0.0001-0.0050 mass %

Mg and REM can be contained because they are elements having an effect of forming a stable sulfide compared to MnS and $Cu_2S$ at a high temperature to improve the magnetic properties. Each element is preferably added in an amount of not less than 0.0001 mass % to obtain the above effect. On the other hand, when they are excessively added, the effect is saturated and it becomes economically disadvantageous so that the upper limit is preferably 0.0050 mass %.

In the non-oriented electrical steel sheet, the remainder other than the above ingredients is Fe and inevitable impurities. However, other elements can be contained within a range not damaging the action and desired effect. For example, elements contained as an inevitable impurity can be allowed within a range of V: not more than 0.004 mass %, Nb: not more than 0.004 mass %, B: not more than 0.0005 mass %, and Ti: not more than 0.002 mass %.

Next, the oxide inclusions existing in our steel sheet will be described below.

It is preferable that $(CaO/SiO_2)$ is not less than 0.50 and $(Al_2O_3/(SiO_2+Al_2O_3+CaO))$ is not more than 0.15 in the oxide inclusions existing in an thickness section of the product sheet in the rolling direction and having a size of not less than 0.2 μm in the thickness direction to obtain excellent magnetic properties. When the ratio is outside the above range, the oxide inclusions are extended by hot rolling to block the grain growth in self annealing after the hot rolling, hot band annealing and finish annealing and deteriorate the magnetic properties. More preferably, $CaO/SiO_2$ is not less than 0.60 and $(Al_2O_3/(SiO_2+Al_2O_3+CaO))$ is not more than 0.10. Moreover, the chemical composition of the oxide inclusions existing in the steel sheet is represented by an average value when 100 or more of oxide inclusions existing in a section (L-section) parallel to the rolling direction of the steel sheet are analyzed by SEM (scanning electron microscope). The oxide inclusion may be a composite with the other compound such as sulfide or the like.

The production method of the non-oriented electrical steel sheet will be described below. The non-oriented electrical steel sheet can be produced by usual equipment through a usual process used in the production of non-oriented electrical steel sheets.

At first, molten iron having a S concentration decreased by subjecting to a preliminary treatment for molten iron or the like is decarburized in a converter to decrease the carbon concentration and further subjected to denitriding in a vacuum degassing apparatus while decarburizing C to an extremely low concentration zone. After the C concentration reaches preferably to not more than 0.0050 mass %, Si and/or Si alloy are added for the double purpose of adjusting the Si concentration to a given concentration and deoxidizing, and then another element or alloy for the composition adjustment such as metallic Mn or the like is added to perform final composition adjustment. A desulfurizer such as CaO may be added in the vacuum degassing to decrease the S concentration. Moreover, a part of the alloy may be added in the tapping from the converter.

Thereafter, Ca alloy (CaSi alloy) is added to the molten steel. As a method of adding Ca alloy can be used an injection method, a method of adding iron-covered wires and so on.

In this case, it is important that (T. Ca/T. O) in the molten steel having the adjusted composition is necessary to be controlled to not less than 0.50, but not more than 2.0, whereby the iron loss property can be improved.

It is effective to increase the amount of Ca alloy (CaSi alloy) added to the molten steel or to sufficiently ensure the deoxidizing time or the like in the vacuum degassing to decrease the oxygen amount to control the above (T. Ca/T.O) to not less than 0.50. Of course, these treatments are necessary to be performed within a range that (T. Ca/T. O) does not exceed 2.0.

Moreover, it is important that (sol. Al/Si) is controlled to not more than 0.0020 by limiting an Al addition amount as much as possible. Thus, the iron loss property can be more improved.

Thereafter, the molten steel produced by the aforementioned method is shaped into a raw steel material (slab) by a continuous casting method or an ingot making-blooming method or the like.

The slab is then subjected to hot rolling. A slab reheating temperature SRT prior to the hot rolling preferably falls within 1000-1250° C. The SRT exceeding 1250° C. causes larger energy loss, which is not economical. In addition, there is a fear of decreasing a high-temperature strength of the slab and causing production troubles such as slab sagging and so on. On the other hand, when it is lower than 1000° C., deformation resistance in hot working is increased and hence the hot rolling becomes difficult.

The subsequent hot rolling may be performed under a usual condition. The sheet thickness in the hot rolling preferably falls within 1.5-2.8 mm from a viewpoint of ensuring productivity. When it is less than 1.5 mm, rolling troubles are increased during the hot rolling, while when it exceeds 2.8 mm, cold rolling reduction becomes too high and the texture is deteriorated. More preferably, the sheet thickness in the hot rolling falls within 1.7-2.4 mm.

The steel sheet (hot rolled sheet) after the hot rolling may be or may not be subjected to a hot band annealing, but it is advantageous to omit the hot band annealing from a viewpoint of decreasing the production cost. When the hot band annealing is omitted, it is necessary that a coiling temperature after the hot rolling is not lower than 550° C. When it is lower than 550° C., self-annealing after the coiling becomes insufficient to decrease a recrystallization ratio of the steel sheet before cold rolling, and hence ridging is caused and/or the magnetic flux density is decreased. Preferably, the coiling temperature is not lower than 600° C.

On the other hand, when the hot band annealing is conducted, a soaking temperature in the hot band annealing is necessary to fall within 900-1150° C. When the soaking temperature is lower than 900° C., a rolling structure remains and the effect of improving the magnetic properties cannot be obtained sufficiently. While when it exceeds 1150° C., the crystal grains are coarsened and cracking is easily caused in the cold rolling, which is economically disadvantageous. Preferably, it is 950-1050° C.

Needless to say, even when the hot band annealing is conducted, the coiling temperature may be not lower than 550° C.

The hot rolled sheet after the hot rolling or after the hot band annealing is subjected to a single cold rolling or two or more cold rollings interposing an intermediate annealing therebetween to provide a cold rolled sheet having a final sheet thickness. In this case, it is preferable to adopt a so-called warm rolling by raising the sheet temperature to 200° C. to increase the magnetic flux density. The thickness of the cold rolled sheet (final sheet thickness) is not particularly defined, but it is preferably 0.10-0.60 mm. When the thickness is less than 0.10 mm, the productivity lowers, while when it exceeds 0.60 mm, the effect of decreasing the iron loss is small. Moreover, it is preferably 0.10-0.35 mm when the iron loss is considered important.

Thereafter, the steel sheet cold rolled to the final thickness (cold rolled sheet) is subjected to a finish annealing by continuous annealing. In the finish annealing, a soaking temperature is preferably 700-1150° C. When the soaking temperature is lower than 700° C., the recrystallization is not promoted sufficiently and hence not only the good magnetic properties but also the effect of shape correction by the continuous annealing cannot be obtained. When it exceeds 1150° C., energy loss becomes large and it becomes uneconomical.

Then, the steel sheet after the finish annealing is preferably coated and baked on the steel sheet surface with an insulating film, if necessary to further decrease the iron loss. Moreover, the insulating film is preferably an organic film containing a resin when the good punchability is required. Also, it is preferably a semi-organic film or an inorganic film when the weldability is considered important.

Example 1

Steels of Nos. 1-37 having different chemical compositions shown in Table 1 are prepared and shaped into slabs by a continuous casting method. In the preparation of the steel, Si, Ca and Al are added as a deoxidizer. As a Ca source is used CaSi. The addition amounts of these deoxidizers and CaSi are properly adjusted in accordance with the contents of O, N and S in the molten steel.

Then, each slab is reheated to 1080-1180° C. and hot rolled to obtain a hot rolled sheet having a sheet thickness of 2.3 mm. In this case, the coiling temperature is 600° C. (constant).

Then, the hot rolled sheet is pickled and cold rolled to obtain a cold rolled sheet having a final sheet thickness of 0.50 mm, which is subjected to a final annealing by holding at a soaking temperature of 1000° C. for 10 seconds and coated with an insulating film to provide a non-oriented electrical steel sheet (product sheet).

TABLE 1

| Steel No | Chemical composition (mass %) | | | | | | | | | |
|---|---|---|---|---|---|---|---|---|---|---|
| | C | Si | Mn | P | S | sol. Al | N | T. Ca | T. O | Others |
| 1 | 0.0021 | 1.65 | 0.42 | 0.07 | 0.0011 | 0.0003 | 0.0018 | 0.0018 | 0.0040 | Sn: 0.03 |
| 2 | 0.0020 | 1.70 | 0.40 | 0.07 | 0.0012 | 0.0008 | 0.0020 | 0.0018 | 0.0025 | Sn: 0.03 |
| 3 | 0.0028 | 1.65 | 0.40 | 0.07 | 0.0012 | 0.0009 | 0.0018 | 0.0022 | 0.0026 | Sn: 0.03 |
| 4 | 0.0020 | 1.65 | 0.37 | 0.07 | 0.0018 | 0.0007 | 0.0020 | 0.0030 | 0.0041 | Sn: 0.03 |
| 5 | 0.0012 | 1.70 | 0.39 | 0.07 | 0.0015 | 0.0009 | 0.0016 | 0.0045 | 0.0043 | Sn: 0.03 |
| 6 | 0.0022 | 1.65 | 0.38 | 0.07 | 0.0015 | 0.0010 | 0.0018 | 0.0030 | 0.0020 | Sn: 0.03 |
| 7 | 0.0017 | 1.70 | 0.42 | 0.07 | 0.0017 | 0.0008 | 0.0021 | 0.0032 | 0.0041 | Sn: 0.03 |

TABLE 1-continued

| | | | | | | | | | | |
|---|---|---|---|---|---|---|---|---|---|---|
| 8 | 0.0023 | 1.65 | 0.42 | 0.07 | 0.0012 | 0.0010 | 0.0022 | 0.0035 | 0.0050 | Sn: 0.03 |
| 9 | 0.0021 | 1.65 | 0.41 | 0.07 | 0.0013 | 0.0007 | 0.0020 | 0.0044 | 0.0069 | Sn: 0.03 |
| 10 | 0.0018 | 1.65 | 0.37 | 0.07 | 0.0015 | 0.0009 | 0.0020 | 0.0042 | 0.0107 | Sn: 0.03 |
| 11 | 0.0018 | 1.65 | 0.41 | 0.07 | 0.0011 | 0.0002 | 0.0020 | 0.0028 | 0.0036 | Sn: 0.03 |
| 12 | 0.0018 | 1.65 | 0.45 | 0.07 | 0.0015 | 0.0006 | 0.0023 | 0.0032 | 0.0040 | Sn: 0.03 |
| 13 | 0.0021 | 1.65 | 0.39 | 0.07 | 0.0010 | 0.0012 | 0.0021 | 0.0029 | 0.0038 | Sn: 0.03 |
| 14 | 0.0023 | 1.65 | 0.36 | 0.07 | 0.0007 | 0.0015 | 0.0018 | 0.0031 | 0.0035 | Sn: 0.03 |
| 15 | 0.0022 | 1.65 | 0.42 | 0.07 | 0.0015 | 0.0025 | 0.0016 | 0.0030 | 0.0037 | Sn: 0.03 |
| 16 | 0.0019 | 1.65 | 0.40 | 0.07 | 0.0012 | 0.0042 | 0.0017 | 0.0035 | 0.0033 | Sn: 0.03 |
| 17 | 0.0019 | 1.50 | 0.25 | 0.07 | 0.0015 | 0.0009 | 0.0020 | 0.0032 | 0.0038 | Sn: 0.03 |
| 18 | 0.0015 | 1.65 | 0.36 | 0.07 | 0.0014 | 0.0008 | 0.0018 | 0.0035 | 0.0034 | Sn: 0.03 |
| 19 | 0.0016 | 1.85 | 0.68 | 0.07 | 0.0012 | 0.0018 | 0.0019 | 0.0031 | 0.0040 | Sn: 0.03 |
| 20 | 0.0016 | 2.40 | 0.92 | 0.07 | 0.0013 | 0.0027 | 0.0020 | 0.0032 | 0.0039 | Sn: 0.03 |
| 21 | 0.0021 | 3.20 | 1.01 | 0.07 | 0.0015 | 0.0042 | 0.0016 | 0.0033 | 0.0037 | Sn: 0.03 |
| 22 | 0.0020 | 3.20 | 1.03 | 0.07 | 0.0013 | 0.0067 | 0.0018 | 0.0035 | 0.0039 | Sn: 0.03 |
| 23 | 0.0018 | 1.65 | 0.39 | 0.03 | 0.0018 | 0.0008 | 0.0018 | 0.0031 | 0.0038 | Sn: 0.03 |
| 24 | 0.0021 | 1.65 | 0.42 | 0.12 | 0.0012 | 0.0009 | 0.0020 | 0.0033 | 0.0035 | — |
| 25 | 0.0023 | 1.65 | 0.40 | 0.07 | 0.0017 | 0.0011 | 0.0021 | 0.0029 | 0.0034 | Sn: 0.05 |
| 26 | 0.0015 | 1.65 | 0.38 | 0.07 | 0.0016 | 0.0012 | 0.0020 | 0.0030 | 0.0032 | Sb: 0.03 |
| 27 | 0.0016 | 1.65 | 0.45 | 0.07 | 0.0016 | 0.0008 | 0.0015 | 0.0028 | 0.0040 | Sn: 0.02, Sb: 0.02 |
| 28 | 0.0015 | 1.65 | 0.44 | 0.07 | 0.0017 | 0.0012 | 0.0019 | 0.0035 | 0.0039 | Ni: 0.05 |
| 29 | 0.0016 | 1.65 | 0.41 | 0.07 | 0.0015 | 0.0008 | 0.0020 | 0.0034 | 0.0035 | Cu: 0.10 |
| 30 | 0.0019 | 1.65 | 0.38 | 0.07 | 0.0014 | 0.0009 | 0.0014 | 0.0032 | 0.0032 | Cr: 0.15 |
| 31 | 0.0020 | 1.65 | 0.38 | 0.07 | 0.0014 | 0.0020 | 0.0016 | 0.0030 | 0.0033 | Cu: 0.15, Cr: 0.10 |
| 32 | 0.0022 | 1.65 | 0.39 | 0.07 | 0.0018 | 0.0008 | 0.0018 | 0.0035 | 0.0038 | REM: 0.001 |
| 33 | 0.0019 | 1.65 | 0.42 | 0.07 | 0.0012 | 0.0022 | 0.0017 | 0.0028 | 0.0035 | Mg: 0.001 |
| 34 | 0.0014 | 0.65 | 0.19 | 0.05 | 0.0018 | 0.0002 | 0.0017 | 0.0030 | 0.0072 | Sn: 0.02 |
| 35 | 0.0016 | 0.66 | 0.18 | 0.05 | 0.0018 | 0.0002 | 0.0017 | 0.0037 | 0.0062 | Sn: 0.02 |
| 36 | 0.0010 | 1.65 | 0.41 | 0.07 | 0.0011 | 0.0020 | 0.0017 | 0.0059 | 0.0033 | — |
| 37 | 0.0010 | 1.65 | 0.40 | 0.07 | 0.0012 | 0.0020 | 0.0015 | 0.0068 | 0.0032 | — |

| Steel No | Composition ratio | | Inclusions | | Magnetic properties | | Remarks |
|---|---|---|---|---|---|---|---|
| | T. Ca/T. O | sol. Al/Si | (*1) | (*2) | Iron loss $W_{15/50}$ (W/kg) | Magnetic flux density $B_{50}(T)$ | |
| 1 | 0.45 | 0.0002 | 0.43 | 0.01 | 3.62 | 1.693 | Comparative Example |
| 2 | 0.72 | 0.0005 | 0.72 | 0.02 | 3.04 | 1.729 | Example |
| 3 | 0.85 | 0.0005 | 0.79 | 0.03 | 2.98 | 1.724 | Example |
| 4 | 0.73 | 0.0004 | 0.67 | 0.02 | 3.02 | 1.725 | Example |
| 5 | 1.05 | 0.0005 | 1.61 | 0.06 | 2.90 | 1.739 | Example |
| 6 | 1.50 | 0.0006 | 2.39 | 0.03 | 2.81 | 1.730 | Example |
| 7 | 0.78 | 0.0005 | 0.54 | 0.02 | 3.30 | 1.711 | Example |
| 8 | 0.70 | 0.0006 | 0.61 | 0.05 | 3.11 | 1.730 | Example |
| 9 | 0.64 | 0.0004 | 0.56 | 0.04 | 3.21 | 1.719 | Example |
| 10 | 0.39 | 0.0005 | 0.29 | 0.03 | 3.76 | 1.684 | Comparative Example |
| 11 | 0.78 | 0.0001 | 0.74 | 0.00 | 3.14 | 1.720 | Example |
| 12 | 0.80 | 0.0004 | 0.97 | 0.04 | 3.06 | 1.725 | Example |
| 13 | 0.76 | 0.0007 | 0.70 | 0.04 | 3.11 | 1.724 | Example |
| 14 | 0.89 | 0.0009 | 0.90 | 0.05 | 2.95 | 1.732 | Example |
| 15 | 0.81 | 0.0015 | 1.02 | 0.13 | 3.20 | 1.715 | Example |
| 16 | 1.06 | 0.0025 | 0.89 | 0.17 | 3.50 | 1.700 | Example |
| 17 | 0.84 | 0.0006 | 1.04 | 0.05 | 2.79 | 1.737 | Example |
| 18 | 1.03 | 0.0005 | 1.07 | 0.02 | 2.93 | 1.699 | Example |
| 19 | 0.78 | 0.0010 | 0.96 | 0.09 | 2.69 | 1.729 | Example |
| 20 | 0.82 | 0.0011 | 0.85 | 0.08 | 2.57 | 1.716 | Example |
| 21 | 0.89 | 0.0013 | 1.23 | 0.12 | 3.03 | 1.709 | Example |
| 22 | 0.90 | 0.0021 | 1.18 | 0.13 | 3.53 | 1.674 | Comparative Example |
| 23 | 0.82 | 0.0005 | 1.09 | 0.06 | 2.87 | 1.732 | Example |
| 24 | 0.94 | 0.0005 | 1.27 | 0.05 | 2.88 | 1.732 | Example |
| 25 | 0.85 | 0.0007 | 0.88 | 0.04 | 3.00 | 1.742 | Example |
| 26 | 0.94 | 0.0007 | 1.35 | 0.07 | 2.84 | 1.732 | Example |
| 27 | 0.70 | 0.0005 | 0.65 | 0.03 | 3.14 | 1.716 | Example |
| 28 | 0.90 | 0.0007 | 0.92 | 0.04 | 3.05 | 1.732 | Example |
| 29 | 0.97 | 0.0005 | 1.10 | 0.03 | 2.95 | 1.732 | Example |
| 30 | 1.00 | 0.0005 | 1.06 | 0.02 | 2.96 | 1.732 | Example |
| 31 | 0.91 | 0.0012 | 1.01 | 0.09 | 2.95 | 1.725 | Example |
| 32 | 0.92 | 0.0005 | 1.12 | 0.04 | 2.98 | 1.723 | Example |
| 33 | 0.80 | 0.0013 | 0.86 | 0.12 | 3.13 | 1.709 | Example |
| 34 | 0.42 | 0.0003 | 0.36 | 0.02 | 4.53 | 1.746 | Comparative Example |
| 35 | 0.60 | 0.0003 | 0.61 | 0.02 | 4.12 | 1.751 | Example |
| 36 | 1.84 | 0.0012 | 1.45 | 0.02 | 3.16 | 1.722 | Example |
| 37 | 2.10 | 0.0012 | 1.51 | 0.02 | Cannot be evaluated due to fracture | | Comparative Example |

(*1): $CaO/SiO_2$
(*2): $Al_2O_3/(SiO_2 + Al_2O_3 + CaO)$

Then, a section of the thus obtained product sheet parallel to the rolling direction (L-section) is observed by a scanning electron microscope (SEM) to analyze chemical compositions of 100 or more oxide inclusions, from which an average value of CaO, $SiO_2$ and $Al_2O_3$ is obtained and a value of $(CaO/SiO_2)$ and $(Al_2O_3/(SiO_2+Al_2O_3+CaO))$ are calculated.

Also, Epstein test specimens are cut out from the product sheet in the rolling direction (L) and the direction perpendicular to the rolling direction (C) to measure a magnetic flux density $B_{50}$ (magnetic flux density at a magnetization force of 5000 A/m) and an iron loss $W_{15/50}$ (iron loss excited at a magnetic flux density of 1.5 T and a frequency of 50 Hz) according to JIS C2552.

a hot band annealing is performed by holding at a soaking temperature of 1000° C. for 30 seconds through a continuous annealing after the hot rolling.

With respect to the thus obtained product sheet, inclusions are analyzed by SEM to calculate average ratios of CaO, $SiO_2$ and $Al_2O_3$ in the inclusions and $(CaO/SiO_2)$ and $(Al_2O_3/(SiO_2+Al_2O_3+CaO))$ like Example 1, while a magnetic flux density $B_{50}$ and an iron loss $W_{15/50}$ are measured.

The above measured results are also shown in Table 2. As seen from these results, the non-oriented electrical steel sheets produced under our conditions have excellent magnetic properties by increasing the coiling temperature after the hot rolling to not lower than 550° C. even when the hot band annealing is not performed.

TABLE 2

| Steel symbol | Chemical composition (mass %) | | | | | | | | | Composition ratio | |
|---|---|---|---|---|---|---|---|---|---|---|---|
| | C | Si | Mn | P | S | sol. Al | N | T. Ca | T. O | Sn | T. Ca/T. O | sol. Al/Si |
| 1 | 0.002 | 1.7 | 0.44 | 0.1 | 0.002 | 0.0008 | 0.002 | 0.004 | 0.004 | 0.04 | 1.00 | 0.0005 |
| 2 | 0.002 | 1.7 | 0.43 | 0.1 | 0.002 | 0.0008 | 0.002 | 0.004 | 0.004 | 0.05 | 0.93 | 0.0005 |
| 3 | 0.002 | 1.7 | 0.43 | 0.1 | 0.002 | 0.0007 | 0.002 | 0.004 | 0.003 | 0.04 | 1.19 | 0.0004 |
| 4 | 0.002 | 1.7 | 0.43 | 0.1 | 0.002 | 0.0008 | 0.002 | 0.004 | 0.004 | 0.04 | 1.03 | 0.0005 |
| 5 | 0.002 | 1.7 | 0.44 | 0.1 | 0.002 | 0.0007 | 0.002 | 0.004 | 0.004 | 0.04 | 0.95 | 0.0004 |
| 6 | 0.002 | 1.7 | 0.44 | 0.1 | 0.002 | 0.0007 | 0.002 | 0.004 | 0.003 | 0.04 | 1.15 | 0.0004 |
| 7 | 0.002 | 1.7 | 0.43 | 0.1 | 0.002 | 0.0007 | 0.002 | 0.004 | 0.003 | 0.04 | 1.09 | 0.0004 |
| 8 | 0.002 | 1.7 | 0.44 | 0.1 | 0.002 | 0.0008 | 0.002 | 0.004 | 0.004 | 0.04 | 1.00 | 0.0004 |

| Steel symbol | Inclusions | | Coiling Temperature in hot rolling (° C.) | Presence or absence of hot band annealing | Magnetic properties | | Remarks |
|---|---|---|---|---|---|---|---|
| | (*1) | (*2) | | | Iron loss $W_{15/50}$ (W/kg) | Magnetic Flux density $B_{50}$(T) | |
| 1 | 1.10 | 0.03 | 580 | Absence | 3.04 | 1.731 | Example |
| 2 | 1.02 | 0.03 | 560 | Absence | 3.04 | 1.730 | Example |
| 3 | 1.15 | 0.03 | 540 | Absence | 3.06 | 1.725 | Example |
| 4 | 1.11 | 0.03 | 520 | Absence | 3.06 | 1.723 | Example |
| 5 | 1.07 | 0.03 | 520 | Presence | 3.00 | 1.735 | Example |
| 6 | 1.11 | 0.03 | 600 | Absence | 3.03 | 1.732 | Example |
| 7 | 1.12 | 0.03 | 650 | Absence | 3.01 | 1.734 | Example |
| 8 | 1.06 | 0.03 | 600 | Presence | 3.00 | 1.737 | Example |

(*1): $CaO/SiO_2$
(*2): $Al_2O_3/(SiO_2 + Al_2O_3 + CaO)$

The above measured results are also shown in Table 1. As seen from these results, our steel sheets are low in the iron loss $W_{15/50}$, high in the magnetic flux density $B_{50}$ and have excellent magnetic properties.

Example 2

Steels of Nos. 1-8 having similar chemical compositions shown in Table 2 are prepared by the same method as in Example 1 and shaped into slabs by a continuous casting method. Then, each of the slabs is reheated to 1150° C. and hot rolled to obtain a hot rolled sheet having a sheet thickness of 2.3 mm, which is pickled and cold rolled to obtain a cold rolled sheet having a final sheet thickness of 0.50 mm. Thereafter, the sheet is subjected to a finish annealing by holding a soaking temperature of 1000° C. for 10 seconds and coated with an insulating film to provide a non-oriented electrical steel sheet (product sheet). In this case, a coiling temperature after the hot rolling is varied within a range of 520-650° C. as shown in Table 2. Moreover, each steel of Nos. 5 and 8 corresponds to when Example 3

Steels of Nos. 1-19 having different chemical compositions shown in Table 3 are prepared in the same way as in Example 1 and shaped into slabs by a continuous casting method. Then, each slab is reheated to 1150° C. and hot rolled to obtain a hot rolled sheet having a sheet thickness of 1.9 mm, which is pickled and cold rolled to obtain a cold rolled sheet having a final sheet thickness varied within a range of 0.20-0.50 mm. Thereafter, the sheet is subjected to a finish annealing by holding at a soaking temperature of 1000° C. for 10 seconds and coated with an insulating film to provide a non-oriented electrical steel sheet (product sheet). Moreover, a coiling temperature after the hot rolling is 600° C.

With respect to the thus obtained product sheet, inclusions are analyzed by SEM in the same way as in Example 1 to calculate average ratios of CaO, $SiO_2$ and $Al_2O_3$ in the inclusions and $(CaO/SiO_2)$ and $(Al_2O_3/(SiO_2+Al_2O_3+CaO))$, while a magnetic flux density $B_{50}$ and an iron loss $W_{15/50}$ are measured.

The above measured results are also shown in Table 3. As seen from these results, the non-oriented electrical steel sheets produced under our conditions have excellent magnetic properties even when the sheet thickness is varied.

TABLE 3

| Steel | Chemical composition (mass %) | | | | | | | | | | Composition ratio | |
|---|---|---|---|---|---|---|---|---|---|---|---|---|
| No | C | Si | Mn | P | S | sol. Al | N | T. Ca | T. O | Sn | T. Ca/T. O | sol. Al/Si |
| 1 | 0.0021 | 1.65 | 0.42 | 0.07 | 0.0011 | 0.0003 | 0.0018 | 0.0018 | 0.0040 | 0.06 | 0.45 | 0.0002 |
| 2 | 0.0020 | 1.65 | 0.42 | 0.07 | 0.0011 | 0.0003 | 0.0018 | 0.0018 | 0.0040 | 0.06 | 0.45 | 0.0002 |
| 3 | 0.0021 | 1.65 | 0.42 | 0.07 | 0.0011 | 0.0003 | 0.0018 | 0.0018 | 0.0040 | 0.06 | 0.45 | 0.0002 |
| 4 | 0.0020 | 1.70 | 0.40 | 0.07 | 0.0012 | 0.0008 | 0.0020 | 0.0018 | 0.0025 | 0.06 | 0.72 | 0.0005 |
| 5 | 0.0020 | 1.70 | 0.40 | 0.07 | 0.0012 | 0.0008 | 0.0020 | 0.0018 | 0.0025 | 0.06 | 0.72 | 0.0005 |
| 6 | 0.0020 | 1.70 | 0.40 | 0.07 | 0.0012 | 0.0008 | 0.0020 | 0.0018 | 0.0025 | 0.06 | 0.72 | 0.0005 |
| 7 | 0.0020 | 0.50 | 0.04 | 0.07 | 0.0012 | 0.0007 | 0.0019 | 0.0033 | 0.0037 | 0.06 | 0.81 | 0.0014 |
| 8 | 0.0020 | 1.70 | 1.60 | 0.07 | 0.0012 | 0.0008 | 0.0019 | 0.0032 | 0.0038 | 0.06 | 0.84 | 0.0005 |
| 9 | 0.0020 | 1.70 | 2.10 | 0.07 | 0.0012 | 0.0008 | 0.0020 | 0.0032 | 0.0040 | 0.06 | 0.86 | 0.0005 |
| 10 | 0.0020 | 2.1 | 1.00 | 0.07 | 0.0010 | 0.0004 | 0.0020 | 0.0040 | 0.0032 | 0.06 | 1.25 | 0.0002 |
| 11 | 0.0021 | 2.5 | 1.00 | 0.07 | 0.0010 | 0.0004 | 0.0020 | 0.0040 | 0.0035 | 0.06 | 1.14 | 0.0002 |
| 12 | 0.0020 | 2.9 | 1.00 | 0.07 | 0.0010 | 0.0004 | 0.0020 | 0.0039 | 0.0035 | 0.06 | 1.11 | 0.0001 |
| 13 | 0.0020 | 3.3 | 1.00 | 0.07 | 0.0010 | 0.0004 | 0.0020 | 0.0039 | 0.0033 | 0.06 | 1.18 | 0.0001 |
| 14 | 0.0020 | 2.1 | 0.50 | 0.07 | 0.0010 | 0.0004 | 0.0020 | 0.0039 | 0.0033 | 0.06 | 1.18 | 0.0002 |
| 15 | 0.0020 | 2.1 | 0.80 | 0.07 | 0.0010 | 0.0004 | 0.0020 | 0.0040 | 0.0035 | 0.06 | 1.14 | 0.0002 |
| 16 | 0.0020 | 2.1 | 1.10 | 0.07 | 0.0011 | 0.0004 | 0.0020 | 0.0040 | 0.0036 | 0.06 | 1.11 | 0.0002 |
| 17 | 0.0021 | 2.1 | 1.40 | 0.07 | 0.0010 | 0.0004 | 0.0020 | 0.0039 | 0.0035 | 0.06 | 1.11 | 0.0002 |
| 18 | 0.0020 | 2.1 | 1.80 | 0.07 | 0.0010 | 0.0004 | 0.0020 | 0.0038 | 0.0035 | 0.06 | 1.09 | 0.0002 |
| 19 | 0.0021 | 2.1 | 2.20 | 0.07 | 0.0010 | 0.0004 | 0.0021 | 0.0038 | 0.0035 | 0.06 | 1.09 | 0.0002 |

| Steel | Inclusions | | Magnetic properties | | Sheet thickness | |
|---|---|---|---|---|---|---|
| | | | Iron loss $W_{15/50}$ | Magnetic flux density $B_{50}(T)$ | | |
| No | (*1) | (*2) | (W/kg) | | (mm) | Remarks |
| 1 | 0.43 | 0.01 | 3.62 | 1.693 | 0.50 | Comparative Example |
| 2 | 0.45 | 0.01 | 3.16 | 1.686 | 0.35 | Comparative Example |
| 3 | 0.37 | 0.01 | 2.87 | 1.677 | 0.20 | Comparative Example |
| 4 | 0.71 | 0.02 | 3.04 | 1.729 | 0.50 | Example |
| 5 | 0.72 | 0.02 | 2.25 | 1.724 | 0.35 | Example |
| 6 | 0.77 | 0.02 | 2.09 | 1.718 | 0.20 | Example |
| 7 | 1.40 | 0.11 | 2.66 | 1.749 | 0.35 | Example |
| 8 | 0.71 | 0.02 | 2.98 | 1.738 | 0.50 | Example |
| 9 | 0.74 | 0.02 | 2.92 | 1.725 | 0.50 | Example |
| 10 | 0.70 | 0.02 | 2.30 | 1.733 | 0.35 | Example |
| 11 | 0.61 | 0.02 | 2.11 | 1.723 | 0.35 | Example |
| 12 | 0.59 | 0.02 | 2.03 | 1.711 | 0.35 | Example |
| 13 | 0.52 | 0.02 | 1.90 | 1.700 | 0.35 | Example |
| 14 | 0.72 | 0.02 | 2.45 | 1.741 | 0.35 | Example |
| 15 | 0.71 | 0.02 | 2.38 | 1.737 | 0.35 | Example |
| 16 | 0.71 | 0.02 | 2.27 | 1.732 | 0.35 | Example |
| 17 | 0.71 | 0.02 | 2.20 | 1.725 | 0.35 | Example |
| 18 | 0.72 | 0.02 | 2.15 | 1.719 | 0.35 | Example |
| 19 | 0.75 | 0.02 | 2.11 | 1.712 | 0.35 | Example |

(*1): $CaO/SiO_2$
(*2): $Al_2O_3/(SiO_2 + Al_2O_3 + CaO)$

The invention claimed is:

1. A non-oriented electrical steel sheet having a chemical composition comprising C: not more than 0.0050 mass %, Si: 1.5-5.0 mass %, Mn: 0.15-3.0 mass %, sol. Al: not more than 0.0050 mass %, P: not more than 0.2 mass %, S: not more than 0.0050 mass %, N: not more than 0.0040 mass % and the remainder being Fe and inevitable impurities, wherein a total Ca concentration (T. Ca) in steel is 0.0010-0.0080 mass %, a total oxygen concentration (T. O) is not more than 0.0100 mass %, a concentration ratio (T. Ca/T. O) of a total Ca to a total oxygen is not less than 0.64, but not more than 1.84, a concentration ratio (sol. Al/Si) of sol. Al to Si is not more than 0.0015, a composition ratio ($CaO/SiO_2$) of CaO to $SiO_2$ in oxide inclusions existing in a sheet thickness section in a rolling direction and having a size in a sheet thickness direction of not less than 0.2 μm is 0.54-2.39, and a composition ratio ($Al_2O_3/(CaO+SiO_2+Al_2O_3)$) of $Al_2O_3$ to ($CaO+SiO_2+Al_2O_3$) in the oxide inclusions existing in a sheet thickness section in a rolling direction and having a size in a sheet thickness direction of not less than 0.2 μm is not more than 0.13, and the steel sheet has an iron loss $W_{15/50}$ of 1.90 to 3.30 W/kg and a magnetic flux density $B_{50}$ of 1.699 to 1.751 T.

2. The non-oriented electrical steel sheet according to claim 1, which contains at least one group selected from Group A to Group C:

Group A: one or two selected from Sn: 0.01-0.1 mass % and Sb: 0.01-0.1 mass %;

Group B: one or more selected from Cu: 0.01-0.5 mass %, Ni: 0.01-0.5 mass % and Cr: 0.01-0.5 mass %; and Group C: one or two selected from REM: 0.0001-0.0050 mass % and Mg: 0.0001-0.0050 mass % in addition to the above chemical composition.

3. A method of producing a non-oriented electrical steel sheet by hot rolling a slab having the chemical composition as claimed in claim 1 to form a hot rolled sheet, cold rolling the hot rolled sheet without hot band annealing and subjecting to a finish annealing, wherein a coiling temperature in the hot rolling is not lower than 550° C., thereby producing the non-oriented electrical steel sheet of claim 1.

4. A method of producing a non-oriented electrical steel sheet by hot rolling a slab having the chemical composition as claimed in claim 2 to form a hot rolled sheet, cold rolling the hot rolled sheet without hot band annealing and subjecting to a finish annealing, wherein a coiling temperature in the hot rolling is not lower than 550° C.

5. A method of producing a non-oriented electrical steel sheet by hot rolling a slab having the chemical composition as claimed in claim 1 to form a hot rolled sheet and subjecting the hot rolled sheet to hot band annealing, cold rolling and finish annealing, wherein the hot band annealing is performed at a temperature of 900-1150° C., thereby producing the non-oriented electrical steel sheet of claim 1.

6. A method of producing a non-oriented electrical steel sheet by hot rolling a slab having the chemical composition as claimed in claim 2 to form a hot rolled sheet and subjecting the hot rolled sheet to hot band annealing, cold rolling and finish annealing, wherein the hot band annealing is performed at a temperature of 900-1150° C.

7. A method of producing the non-oriented electrical steel sheet as claimed in claim 1, comprising refining molten iron subjected to desulfurization and dephosphorization in a converter to provide molten steel, subjecting the molten steel to a vacuum degassing process to decarburize C to not more than 0.0050 mass % and adding with elements and/or alloy to adjust a composition, and then adding CaSi alloy to a ladle so that a total Ca concentration in steel (T. Ca) is 0.0010-0.0080 mass %, and a total oxygen concentration (T. O) is not more than 0.0100 mass %, and a concentration ratio (T. Ca/T. O) of total Ca to total oxygen is not less than 0.64 but not more than 1.84, thereby producing the non-oriented electrical steel sheet of claim 1.

8. A method of producing the non-oriented electrical steel sheet as claimed in claim 2, comprising refining molten iron subjected to desulfurization and dephosphorization in a converter to provide molten steel, subjecting the molten steel to a vacuum degassing process to decarburize C to not more than 0.0050 mass % and adding with elements and/or alloy to adjust a composition, and then adding CaSi alloy to a ladle so that a total Ca concentration in steel (T. Ca) is 0.0010-0.0080 mass %, and a total oxygen concentration (T. O) is not more than 0.0100 mass %, and a concentration ratio (T. Ca/T. O) of total Ca to total oxygen is not less than 0.64 but not more than 1.84.

* * * * *